United States Patent [19]

Tanikawa

[11] 4,435,056

[45] Mar. 6, 1984

[54] FILM FEEDING DEVICE

[75] Inventor: Kowji Tanikawa, Tokyo, Japan

[73] Assignee: Olympus Optical Co., Ltd., Tokyo, Japan

[21] Appl. No.: 326,515

[22] Filed: Dec. 2, 1981

[30] Foreign Application Priority Data

Dec. 26, 1980 [JP] Japan ............................. 55-185947

[51] Int. Cl.³ .............................................. G03B 7/00
[52] U.S. Cl. ................................ 354/21; 354/123.11; 354/212; 354/217
[58] Field of Search ................. 354/21, 173, 212, 217, 354/218

[56] References Cited

U.S. PATENT DOCUMENTS

| | | | |
|---|---|---|---|
| 3,605,598 | 9/1971 | Zimmet | 354/212 |
| 4,220,405 | 9/1980 | Stemme et al. | |
| 4,240,734 | 12/1980 | Nomura et al. | |
| 4,367,026 | 1/1983 | Terada et al. | 354/217 |
| 4,384,777 | 5/1983 | Maida | 354/217 |

*Primary Examiner*—Russell E. Adams
*Attorney, Agent, or Firm*—Frishauf, Holtz, Goodman & Woodward

[57] ABSTRACT

When a camera is loaded with a film cassette, information corresponding to the diameter of a film wind shaft with film wound thereon is detected by a film cassette type switch. An address of a ROM is designated by the shaft diameter information, and shaft rotation angle information corresponding to the designated address is read out from the ROM. The film wind shaft is rotated through an angle corresponding to the rotation angle information by the driving force of a pulse motor. When a fixed length of a film is wound on the film wind shaft, the shaft diameter information is updated, a new piece of rotation angle information is read out from the ROM in accordance with the updated shaft diameter information, and the film wind shaft is rotated to be wound with the constant length of the film in accordance with the updated rotation angle information.

12 Claims, 5 Drawing Figures

INITIAL VALUE
SETTING CXT
OR COUNTER

FILM FEEDING DEVICE

BACKGROUND OF THE INVENTION

This invention relates to a film feeding device, more specifically to a film feeding device for feeding a film at regular pitches.

There have been developed various devices to feed a film by motor drive. Stated in Japanese Patent Disclosure No. 116027/75 is a motor drive device in which pulses produced by a film feeding action are counted, and the feeding action is stopped when a predetermined count value is reached. Disclosed in Japanese Patent Application No. 172010/79, moreover, is a film feeding device which is so designed that a wind shaft is practically increased in diameter as the film feeding is forwarded, and that the number of revolutions of a film feeding motor is reduced in inverse proportion to an increase of the feed length of the film to prevent the increase of the film feeding pitch, thereby ensuring constant-pitch film feeding. In these prior art devices, however a film cassette for a different number of exposures cannot enjoy the constant-pitch feeding because of the different diameter of its film wind shaft.

SUMMARY OF THE INVENTION

Accordingly, the object of this invention is to provide a film feeding device capable of constant-pitch film feeding irrespective of the change of the film wind shaft diameter.

According to this invention, there is provided a film feeding device which comprises film wind driving means engaging and rotating a film wind shaft, film wind shaft diameter detecting means for producing information representing the diameter of the film wind shaft with the film wound thereon, wound film length detecting means for detecting the length of a film wound on the film wind shaft and producing wound film length information, means for deciding the rotation angle of the film wind shaft in accordance with the shaft diameter information and the wound film length information, and means for driving the film wind driving means to rotate the film wind shaft through the angle decided by the rotation angle deciding means.

DETAILED DESCRIPTION OF THE PREFERRED EMBODIMENT

Figure 1:
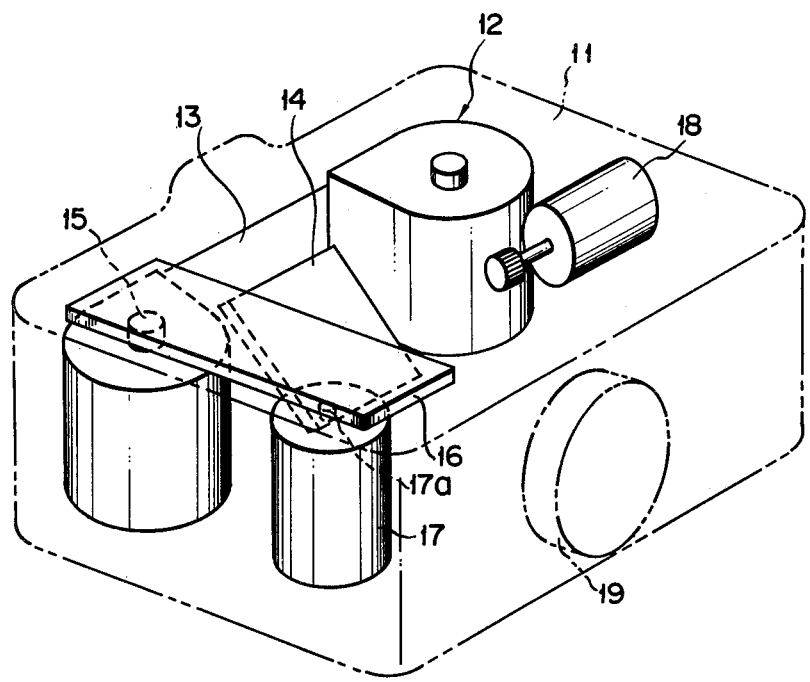
FIG. 1 is a schematic perspective view of a camera provided with a film feeding device according to an embodiment of this invention.

Referring now to the drawing of FIG. 1, there is shown a camera 11 which contains therein a film cassette 12. A mirror shutter 14 is disposed opposite to the film 13 in the film cassette 12. A wind shaft 15 of the film cassette 12 is coupled with a shaft 17a of a film wind motor 17 by means of a transmission gear unit 16. A motor 18 is provided for driving the mirror shutter 14. When the mirror shutter 14 is raised by the motor 18, the film 13 is exposed to an incident light transmitted through a camera lens system 19.

Figure 2:
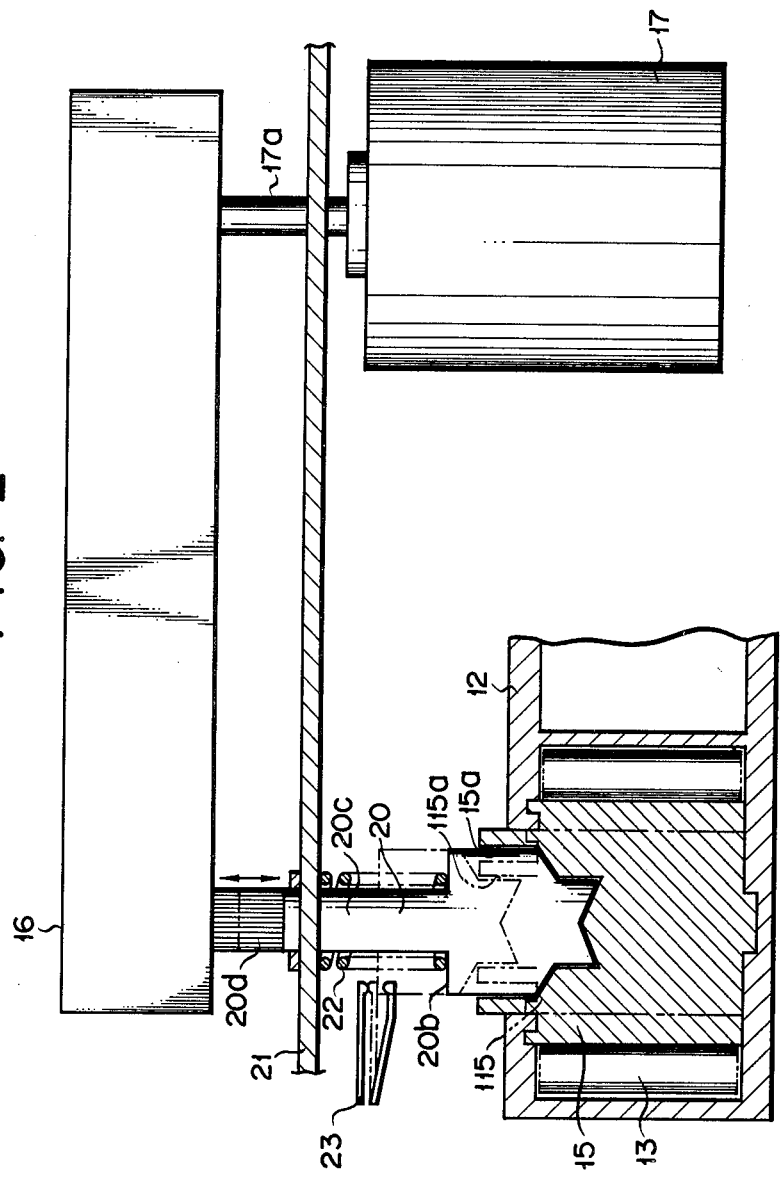
FIG. 2 is a schematic sectional view of the mechanical part of the film feeding device.
Figure 3:
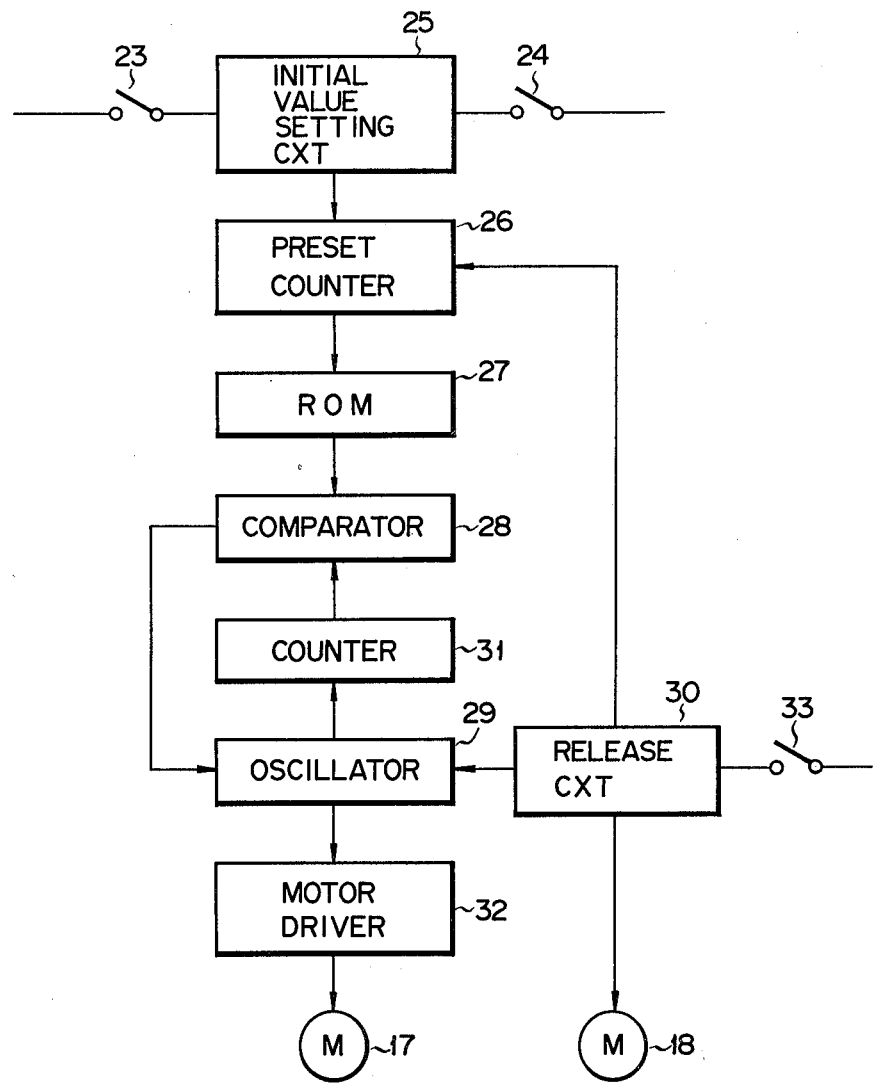
FIG. 3 is a block circuit diagram of the film feeding device of FIG. 1.

As shown in FIG. 2, the film wind shaft 15 of the film cassette 12 is provided with an engaging hole 15a which engages a shaft 20 coupled to the transmission gear unit 16. The shaft 20, which is composed of an engaging portion 20a to engage the engaging hole 15a, a step portion 20b, a shaft portion 20c, and a gear portion 20d, is attached to a baseplate 21 so as to be able to move axially. A spring 22 is provided for urging the shaft 20 toward the film cassette 12. The gear portion 20d is in mesh with a gear in the transmission gear unit 16. The driving source portion of the transmission gear unit 16 is coupled with the shaft 17a of the motor 17. A film cassette type setting switch 23 is disposed in close vicinity to the film wind shaft 15. As shown in FIG. 3, the film cassette type setting switch 23, along with a back cover switch 24, is connected to the control input terminal of an initial value setting circuit 25. The output terminal of the initial value setting circuit 25 is connected with the preset terminal of a preset counter 26 whose output terminal is connected to the address port of a ROM (read-only memory) 27. The address of the ROM 27, storing motor drive data as shown in Table 1, is designated by output data from the preset counter 26.

TABLE 1

| Address | Data |
|---------|------|
| 00 | 100 |
| 01 | 98 |
| 02 | 96 |
| . | . |
| . | . |
| 20 | 50 |
| 21 | 200 |
| 22 | 197 |
| 23 | 194 |
| . | . |
| . | . |
| 60 | 50 |

The output terminal of the ROM 27 is connected to one comparison input terminal of a comparator 28 whose output terminal is connected to the reset terminal of an oscillator 29. The oscillator 29 is so designed as to be set for oscillation in response to the output of a release circuit 30. The output terminal of the oscillator 29 is connected to the respective input terminals of a counter 31 and a motor driver 32. The output terminals of the counter 31 and the motor driver 32 are connected to the other comparison input terminal of the comparator 28 and the film feeding motor 17, respectively. The release circuit 30 is connected to a release switch 33 to operate in response to the operation of the switch 33.

Now there will be described the operation of the film feeding device with the above-mentioned configuration. Suppose the camera 11 is loaded with a 20-exposure film cassette. In this case, the engaging hole 15a is formed deep in the film wind shaft 15 of the film cassette 12. When the shaft 20 on the baseplate 21 is caused to engage the engaging hole 15a of the film wind shaft 15, therefore, it gets deep into the engaging hole 15a. Not pressed by the step portion 20b of the shaft 20, the switch 23 is open in this state. In this state, when the back cover of the camera 11 is shut to close the back cover switch 24, the initial value setting circuit 25 of FIG. 3 sets the preset counter 26 for a value, e.g. "0", which represents the film wind shaft diameter of the 20-exposure film cassette. Subsequently, when a release action is made, the release switch 33 is closed. In response to the operation of the release switch 33, the release circuit 28 drives a shutter mechanism section including the mirror shutter motor 18. When the mirror shutter 14 is raised to expose the film 13 and then lowered, the release circuit 28 supplies the oscillator 29 with a release completion signal. The oscillator 29 oscillates in response to the release completion signal, and supplies a pulse signal to the counter 31 and the motor driver 32. The motor driver 32 rotates the film feeding motor 17 in synchronism with the pulse signal. The rotation of the motor 17 is transmitted to the shaft 20 by the transmission gear unit 16. When the shaft 20 rotates, the film wind shaft 15 of the film cassette 12 rotates to wind the film 13 thereon. At this time, the counter 31 counts the pulses of the pulse signal, and supplies the count value to the comparator 28. The comparator 28 compares the count value from the counter 31 with the data from the ROM 27. Initially, the preset counter 26 is set to "00", and data "100" corresponding to the address 00 of Table 1 is read out from the ROM 27 whose address is designated by the preset counter 26. The data "100", which corresponds to the pulse number of the pulse signal, is compared with the count data from the counter 31. When the data from the counter 31 and the ROM 27 becomes equal, the output signal of the comparator 28 stops the oscillator 29 from producing output pulses, thereby stopping the rotation of the pulse motor 17. At this point of time, the pulse motor 17 has made revolutions corresponding to 100 pulses to cause the wind shaft 15 to rotate through an angle corresponding to the revolutions of the motor 17 and correspondingly to wind the film thereon. When the winding of the film 13 is completed, the release circuit 28 produces a film winding completion signal to cause the preset counter 26 to count up, that is, the shaft diameter information is updated. Subsequently, when the release action is made again to complete exposure, the release circuit 28 produces the release completion signal again to operate the motor driver 32. At this time, an update address signal "01" is delivered from the preset counter 26, so that the ROM 27 produces data "98". Accordingly, the wind shaft 15 rotates through an angle corresponding to the rotation of the pulse motor 17 responsive to 98 pulses. The decrease of 2 pulses compared with the 100 pulses for the preceding rotation corresponds to an increase of the film wind shaft diameter caused by the film winding. Constant-pitch film feeding is achieved by thus decreasing the number of revolutions of the pulse motor 17.

While the 20-exposure film cassette is used in the above-mentioned embodiment, there will now be described a case where the camera unit is loaded with a 40-exposure film cassette. The film wind shaft and the engaging hole of the 40-exposure film cassette are thinner and shallower than those of the 20-exposure film cassette, respectively. Therefore, when the drive shaft 20 engages the engaging hole 115a of the film wind shaft 115 of the 40-exposure film cassette 12, the step portion 20b of the drive shaft 20 stays in an upper position. Accordingly, the step portion 20b abuts against the switch 23 to close the same. In response to the closing of the switch 23 and the back cover switch 24, the initial value setting circuit 25 presets the preset counter 26 to "21". As a result, data "200" is read out from the ROM 27 and applied to the comparator 28. Thus, the pulse motor 17 is supplied with a pulse signal including 200 pulses, so that the film wind shaft 115 rotates through an angle corresponding to the rotation of the motor 17 responsive to 200 pulses, thereby winding the film thereon. Namely, the film in the 40-exposure film cassette is wound with a shaft rotation angle twice as wide as the rotation angle for the film in the 20-exposure film cassette, for the wind shaft of the 40-exposure film cassette is thinner than that of the 20-exposure film cassette. In the next wind, the film is wound correspondingly to the rotation of the pulse motor 17 and 197 pulses in the same manner as aforesaid. As the winding advances in this way, the film is fed at constant pitches by reducing the rotation angle of the wind shaft.

As described above, data set in accordance with the diameter of the wind shaft and the wound film length (wound film amount) are stored in the ROM, and the address of the ROM is designated in accordance with the wind shaft diameter and the wound film length of the loaded film cassette. Then, the data on the designated address is read out, and the rotation angle of the wind shaft is controlled in accordance with the data to ensure constant-pitch film feeding.

Figure 4:
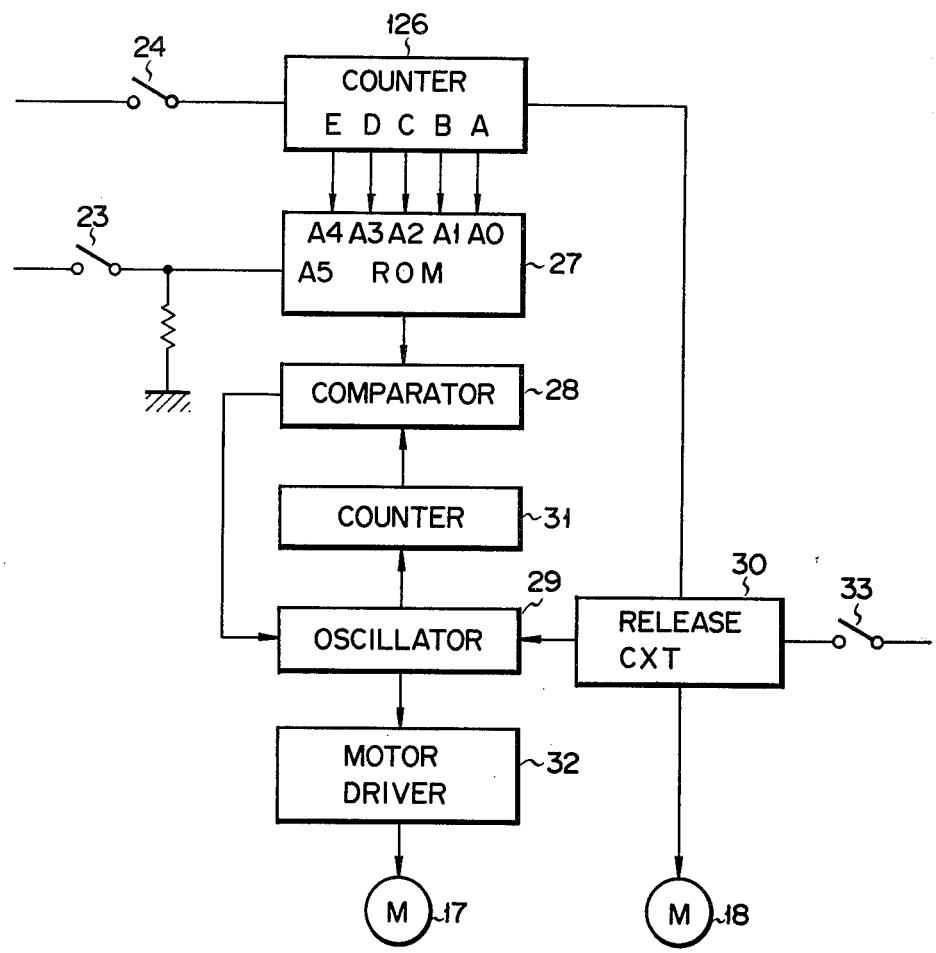
FIG. 4 is a circuit diagram of a film feeding device according to another embodiment of the invention.

In the above-mentioned embodiment, the preset counter is used as the means for producing the addressing data of the ROM. Alternatively, however, a conventional counter 126 may be used for this purpose, as shown in FIG. 4. In this case, the 5-bit counter 126 is combined with a 6-bit ROM 27 so that terminals A, B, C, D and E of the counter 126 are connected to terminals A0, A1, A2, A3 and A4 of the ROM 27, respectively. A terminal A5 of the ROM 27 is connected to a film cassette type switch 23. In this embodiment, data are stored in the ROM 27 as shown in Table 2.

TABLE 2

| Address | Data | |
|---------|------|---|
| 00 | 100 | |
| 01 | 98 | |
| . | . | |
| . | . | A5 = 0 |
| 20 | 50 | |
| . | . | |
| . | . | |
| 64 | 200 | |
| 63 | 197 | |
| . | . | A5 = 1 |
| . | . | |
| 103 | 50 | |

As may be seen from Table 2, when the switch 23 is open, that is, when the terminal A5 of the ROM 27 is set to "0", the address of the ROM 27 is designated by bit outputs from the terminals A, B and E of the counter 126. When the switch 23 is closed, that is, when the terminal A5 of the ROM 27 is set to "1", on the other hand, the address is designated by one bit from the terminal A5 and five bits from the counter 126. As for other operations, they exactly resemble their corresponding operations in the embodiment shown in FIG. 3.

According to this invention, as described above, constant-pitch film feeding can accurately be performed by discriminating variations in the diameter of the wind shaft of the film cassette, setting an initial value of the rotation angle of the wind shaft on the basis of the discrimination data, and successively varying the rotation angle of the wind shaft from the initial value in accordance with the wound film length.

Figure 5:
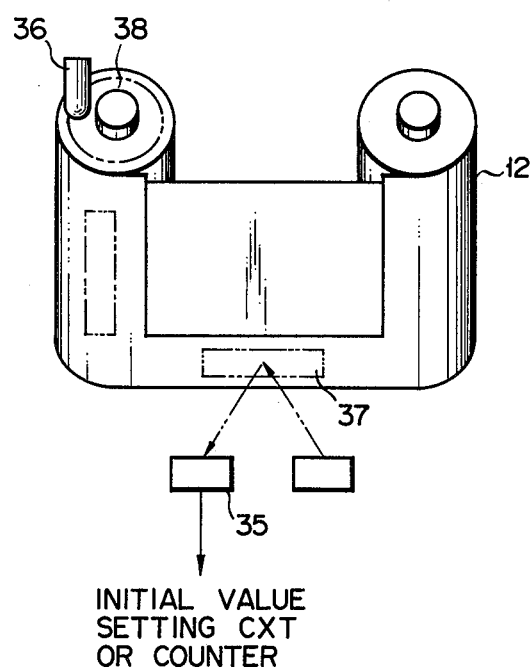
FIG. 5 is a perspective view of a film cassette used in a film feeding device according to still another embodiment of the invention.

The pulse motor used in the above embodiment may be replaced with a combination of a DC motor and a rotary encoder. The wind shaft diameter may be identified for film cassettes of various types, such as 10/20- and 20/40/60-exposure types, as well as the 20/40-exposure type. Moreover, the film cassette type may be identified not only in response to the switching signal, but also by means of a photosensor 35 or a magnetic head 36, as shown in FIG. 5. In this case, an identification code is read out optically or magnetically from an identification code portion 37 or 38 attached to the film cassette 12 so that the preset counter may be preset by an identification code signal. Further, the counter 31 and the comparator 28 may be replaced with a presettable subtraction counter so that the oscillator may cease to oscillate when the current number in the subtraction counter becomes "0".

What is claimed is:

1. A film feeding device comprising:
    film wind driving means engaging a film wind shaft and rotating said film wind shaft to wind a film on said film wind shaft;
    shaft diameter information producing means for producing information representing the diameter of said film wind shaft with said film wound thereon;
    means for updating the shaft diameter information from said shaft diameter information producing means every time a given length of the film is wound on said film wind shaft;
    means for deciding the rotation angle of said film wind shaft and producing a rotation angle information in accordance with the shaft diameter information from said shaft diameter information producing means; and
    means for driving said film wind driving means in accordance with the rotation angle information from said rotation angle information producing means, whereby said film wind shaft is rotated through an angle corresponding to said rotation angle information.

2. A film feeding device according to claim 1, wherein said film wind shaft includes a characteristic portion corresponding to the diameter of said shaft, and said shaft diameter information producing means is composed of means for detecting the characteristic portion of said film wind shaft to produce the shaft diameter information.

3. A film feeding device according to claim 2, wherein said rotation angle information producing means includes memory means storing a plurality of pieces of rotation angle information, and means for addressing said memory means by said shaft diameter information and reading out said rotation angle information.

4. A film feeding device comprising:
    film wind driving means engaging a film wind shaft of a film cassette which contains a film therein and rotating said film wind shaft to wind the film on said film wind shaft;
    shaft diameter information producing means attached to said film cassette and detecting a characteristic portion corresponding to the diameter of said film wind shaft with said film wound thereon to produce shaft diameter information;
    shaft diameter information updating means for updating the shaft diameter information from said shaft diameter information producing means every time a given length of the film is wound on said film wind shaft;
    means for deciding the rotation angle of said film wind shaft and producing rotation angle information in accordance with the shaft diameter information from said shaft diameter information producing means; and
    means for driving said film wind driving means in accordance with the rotation angle information, whereby said film wind shaft is rotated through an angle corresponding to said rotating angle information.

5. A film feeding device according to claim 4, wherein said film wind driving means is formed of a pulse motor, and said means for driving said film wind driving means is formed of means for supplying said pulse motor with a pulse signal corresponding to said rotation angle information.

6. A film feeding device according to claim 4, wherein said shaft diameter information producing means is formed of a preset counter for providing said rotation angle information producing means with the shaft diameter information, and means for setting as an initial value the diameter information corresponding to the diameter of said film wind shaft in said preset counter in response to the detection of said characteristic portion, and said updating means is formed of means for supplying said preset counter with an update signal to update the information in said preset counter every time said given length of the film is wound on said film wind shaft.

7. A film feeding device according to any one of claims 4, 5 or 6, wherein said rotation angle information producing means is formed of memory means storing a plurality of pieces of rotation angle information, and means addressed by the shaft diameter information from said shaft diameter information producing means to read out a corresponding piece of rotation angle information from said memory means.

8. A film feeding device according to claim 4, 5 or 6, wherein said film wind shaft includes an engaging hole with a depth corresponding to the diameter of said shaft, said film wind driving means includes a drive shaft having a step portion and engaging said engaging hole, and said shaft diameter information producing means is formed of switch means to be operated in accordance with the depth of said engaging hole by said step portion when said drive shaft gets engaged with said engaging hole, and means for producing shaft diameter information corresponding to the operating state of said switch means.

9. A film feeding device according to any one of claims 4, 5 or 6, wherein said shaft diameter information producing means is formed of a counter for producing information corresponding to the length of the film wound on said film wind shaft, means for producing bit information in response to the detection of said characteristic portion, and means for supplying said rotation angle information producing means with the information from said counter and the bit information from said bit information producing means as the shaft diameter information.

10. A film feeding device according to any one of claims 4, 5 or 6, wherein said characteristic portion is an identification code member attached to said film cassette, and said shaft diameter information producing means includes means for detecting said identification code.

11. A film feeding device according to claim 10, wherein said detecting means is a photosensor to optically detect said identification code.

12. A film feeding device according to claim 10, wherein said detecting means is a magnetic head to magnetically detect said identification code.

* * * * *